United States Patent
Nakagawa et al.

(10) Patent No.: US 6,421,981 B1
(45) Date of Patent: Jul. 23, 2002

(54) PACKAGING MACHINE INCORPORATING TIMING CONTROLLER

(75) Inventors: Yukio Nakagawa; Masashi Kondo, both of Shiga (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/306,483

(22) Filed: May 6, 1999

(30) Foreign Application Priority Data

May 18, 1998 (JP) .......................................... 10-135780

(51) Int. Cl.[7] .............................................. B65B 57/00
(52) U.S. Cl. ......................................................... 53/58
(58) Field of Search ............................ 53/55, 58, 496, 53/64, 66, 74, 75, 545, 547, 551, 555; 327/518; 349/1; 73/901; 345/326; 395/161

(56) References Cited

U.S. PATENT DOCUMENTS

| | | |
|---|---|---|
| 4,332,123 A | 6/1982 | Calvert |
| 4,574,566 A * | 3/1986 | Eaves et al. ................... 53/55 |
| 5,147,491 A * | 9/1992 | Thomas et al. ................ 53/58 |
| 5,168,883 A * | 12/1992 | Winn ............................. 53/58 |
| 5,345,389 A | 9/1994 | Calvin et al. |
| 5,351,464 A | 10/1994 | Francioni |
| 5,419,677 A | 5/1995 | Cohn |
| 5,500,938 A * | 3/1996 | Cahill et al. ................. 395/161 |
| 5,519,828 A * | 5/1996 | Rayner ........................ 395/161 |
| 5,540,035 A | 7/1996 | Plahm et al. |
| 5,706,627 A * | 1/1998 | Kirka et al. ..................... 53/55 |
| 5,724,786 A * | 3/1998 | Singh et al. .................... 53/55 |
| 5,822,949 A * | 10/1998 | Naoi .............................. 53/55 |
| 5,971,905 A * | 10/1999 | Fukuda ......................... 53/551 |

* cited by examiner

Primary Examiner—Scott A. Smith
Assistant Examiner—John Paradiso
(74) Attorney, Agent, or Firm—Beyer Weaver & Thomas LLP

(57) ABSTRACT

A vertical pillow type form-fill-seal packaging machine with transverse sealers incorporates a timing controller for adjusting the timing for clamping a tubularly formed film with the sealers such that articles being dropping in to be packaged will not be caught in between. A display device displays a time axis or parallel axes along which markers indicate the times of arrival of the falling articles to be packaged and the sealers at the clamping position for the sealers. As the user moves the marker for indicating the arrival time of the sealers, the timing controller adjusts the operating mode of the sealers such that the sealers will clamp the film at the time specified by the user according to the displayed time of arrival of the articles.

4 Claims, 6 Drawing Sheets

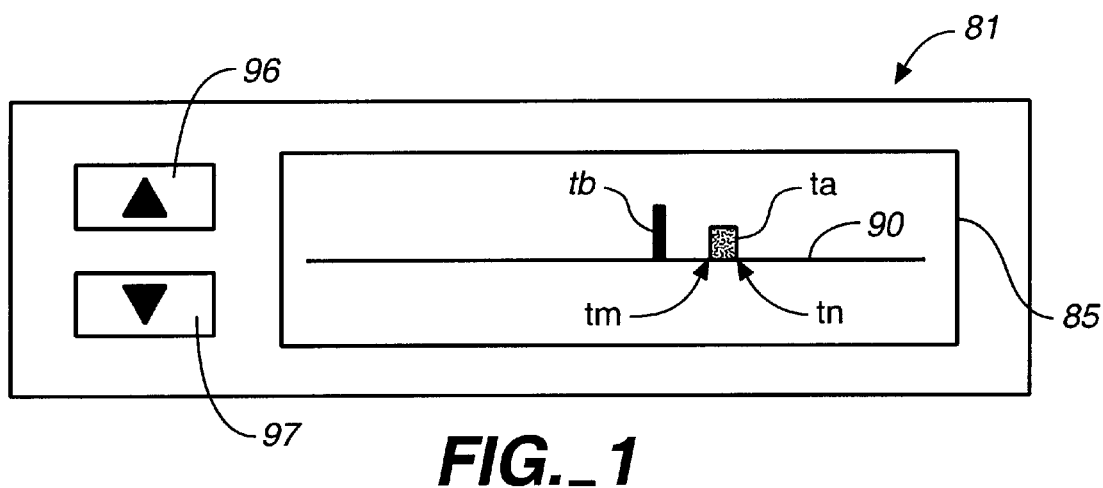
FIG._1
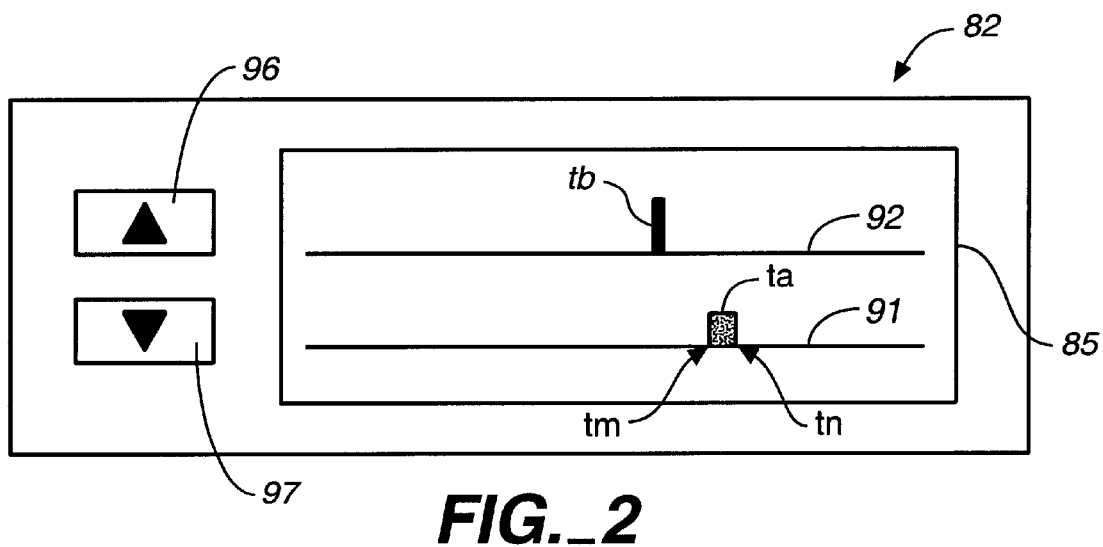
FIG._2
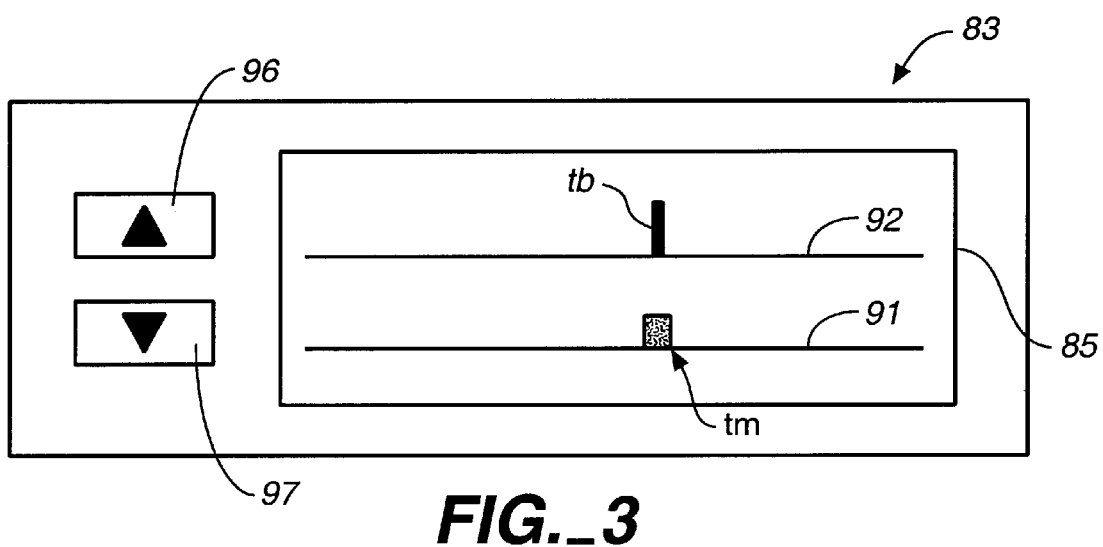
FIG._3

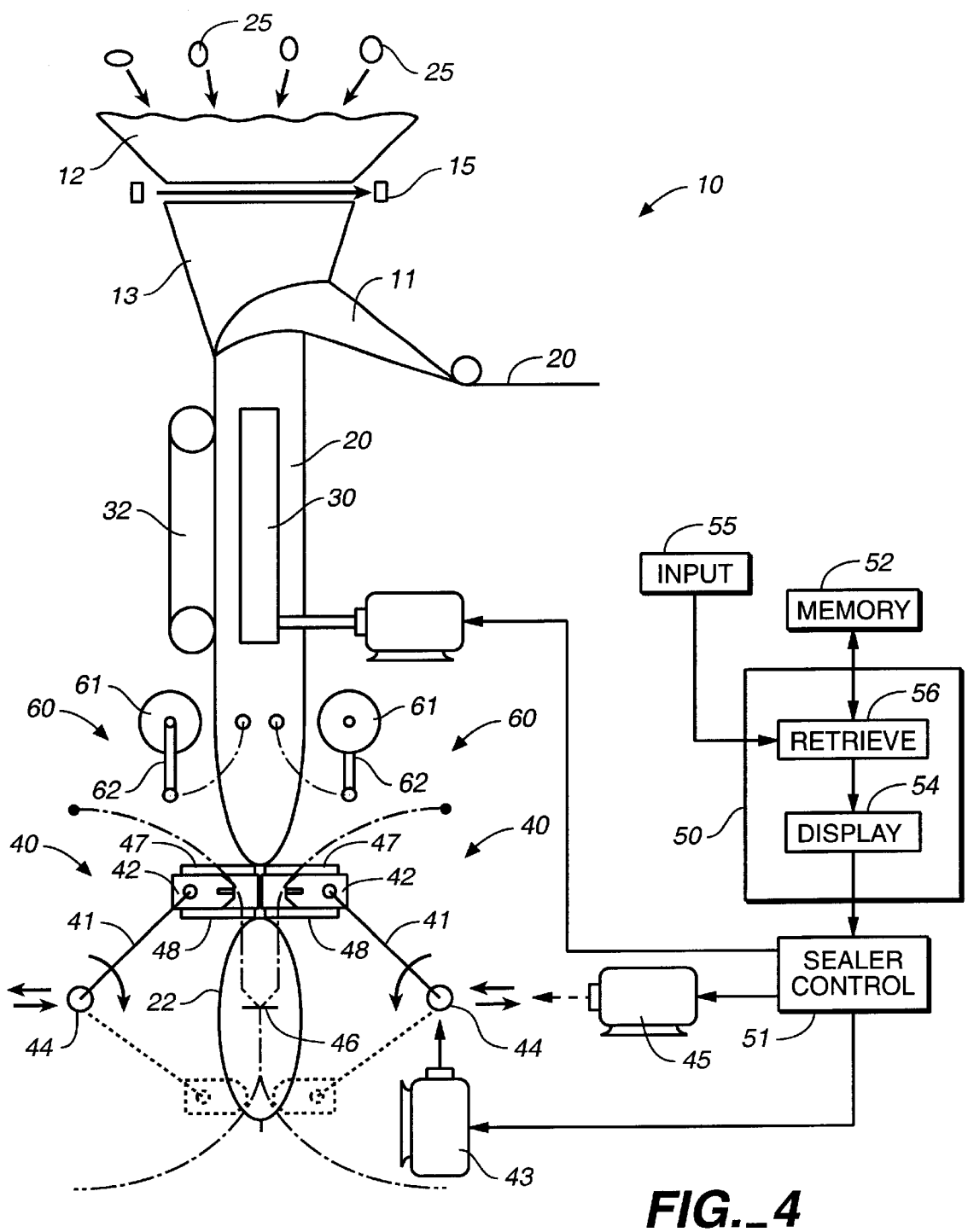
FIG._4

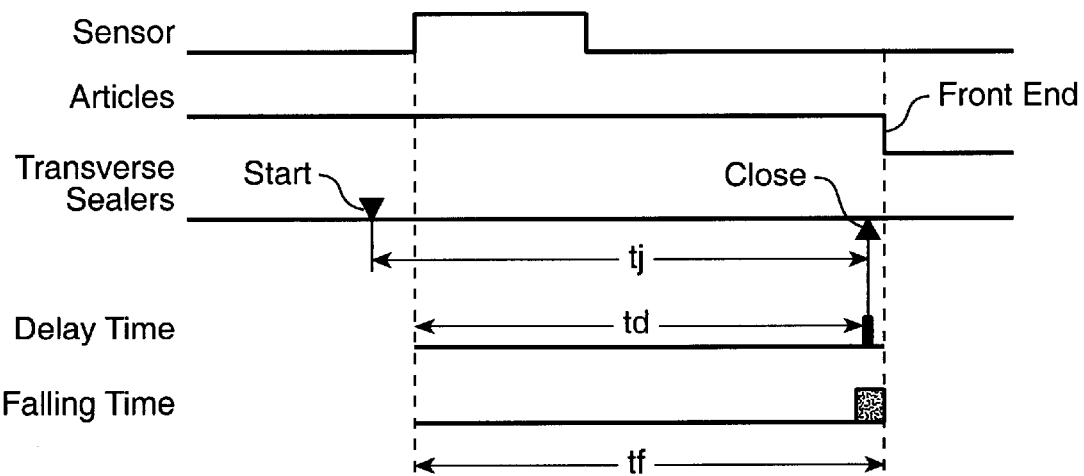
FIG._5
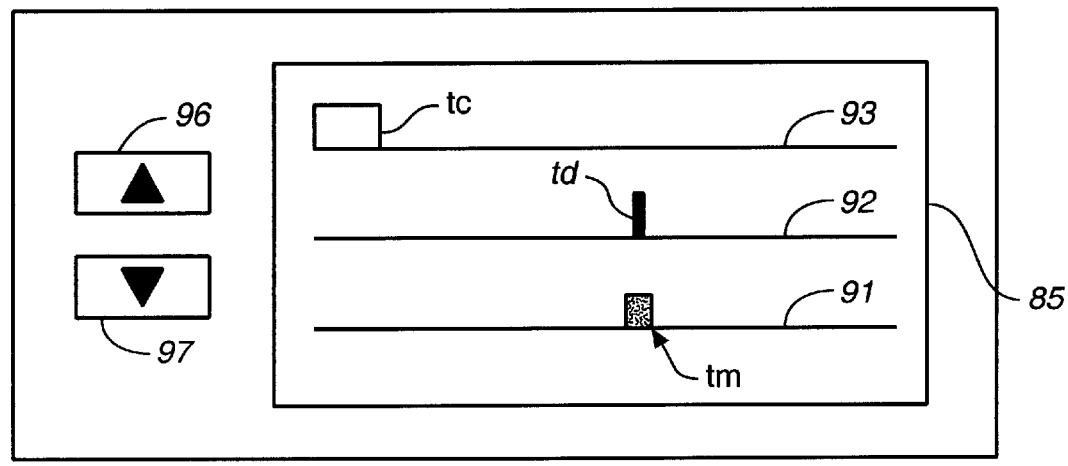
FIG._7

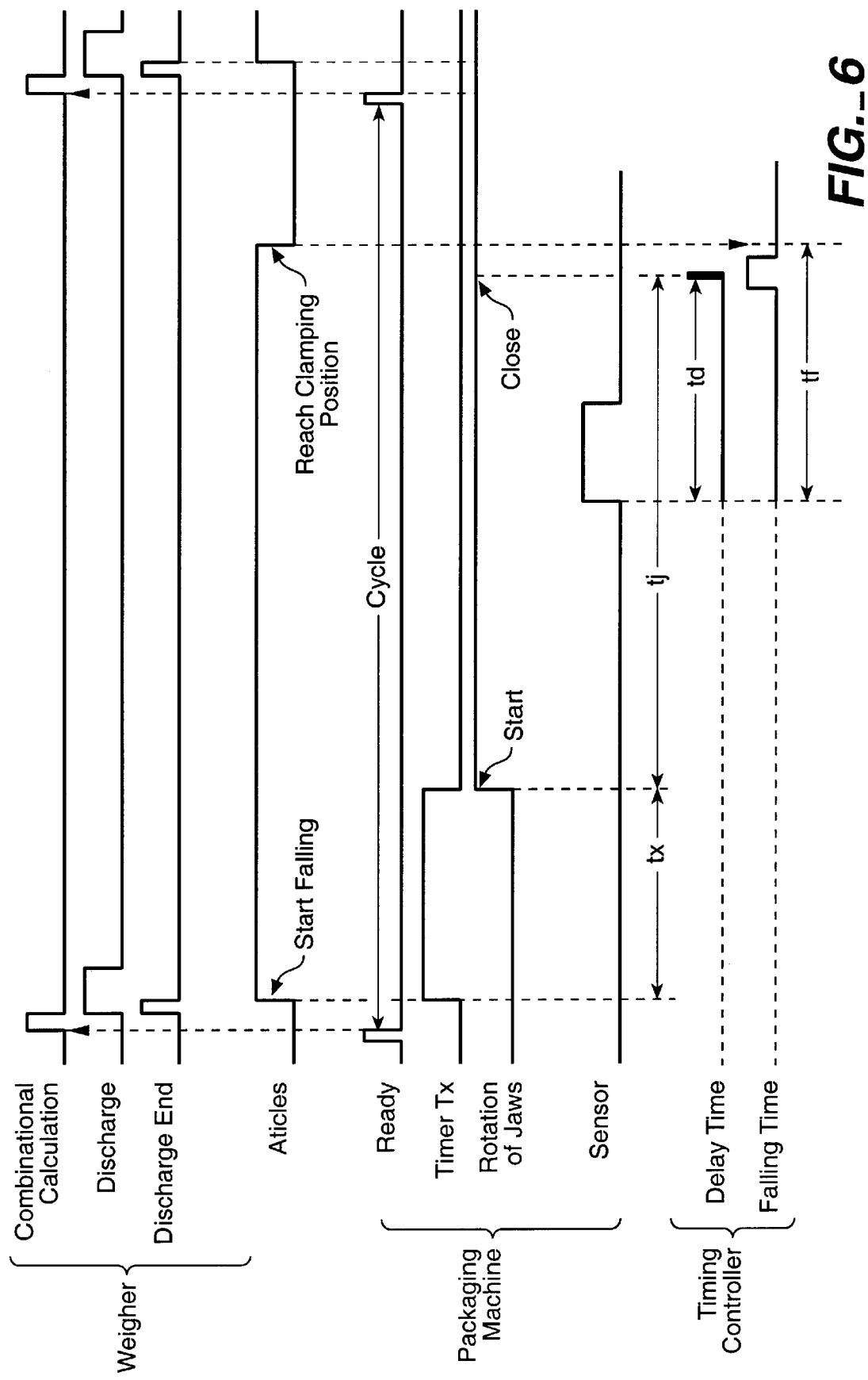
FIG._6

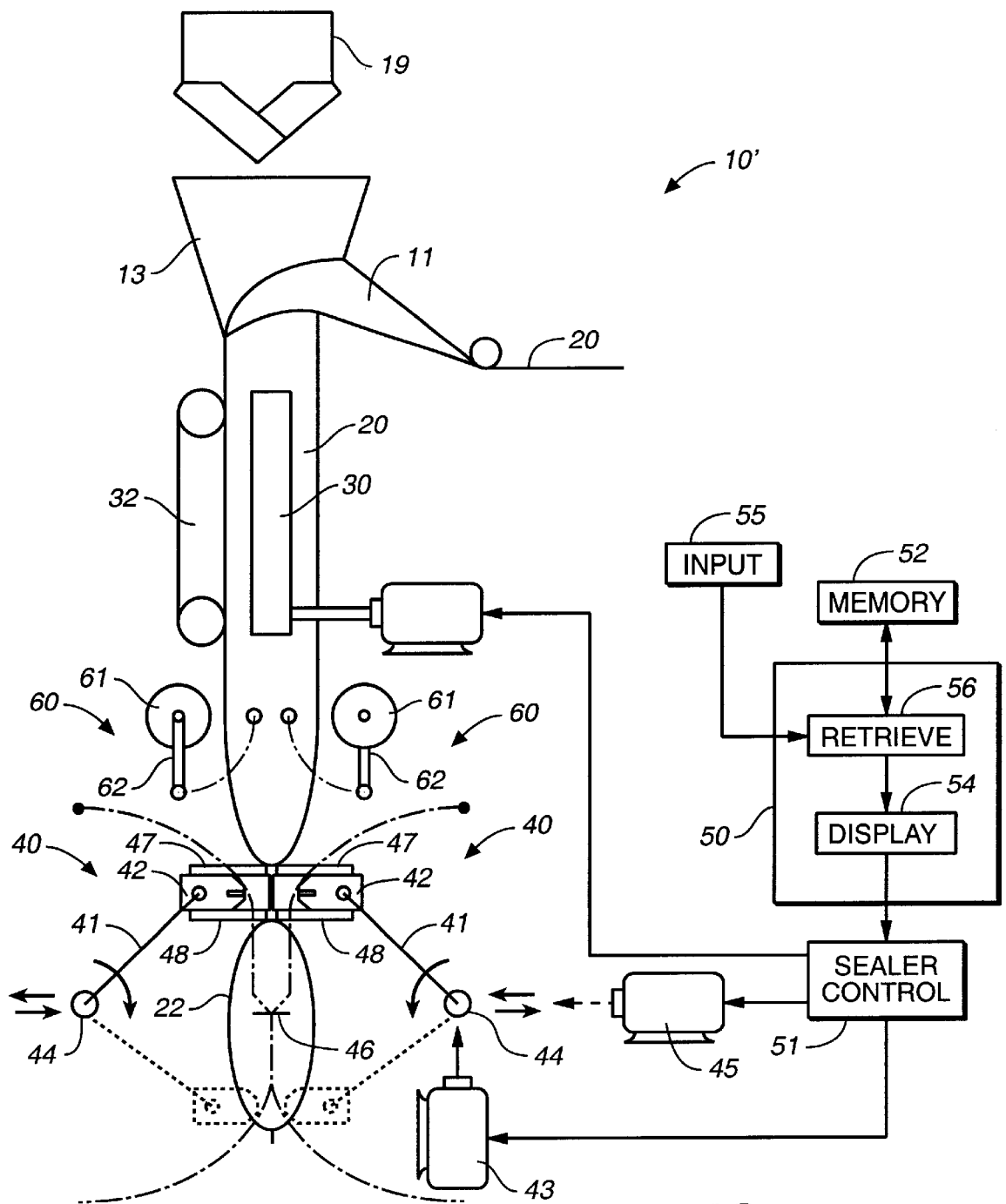
FIG._8

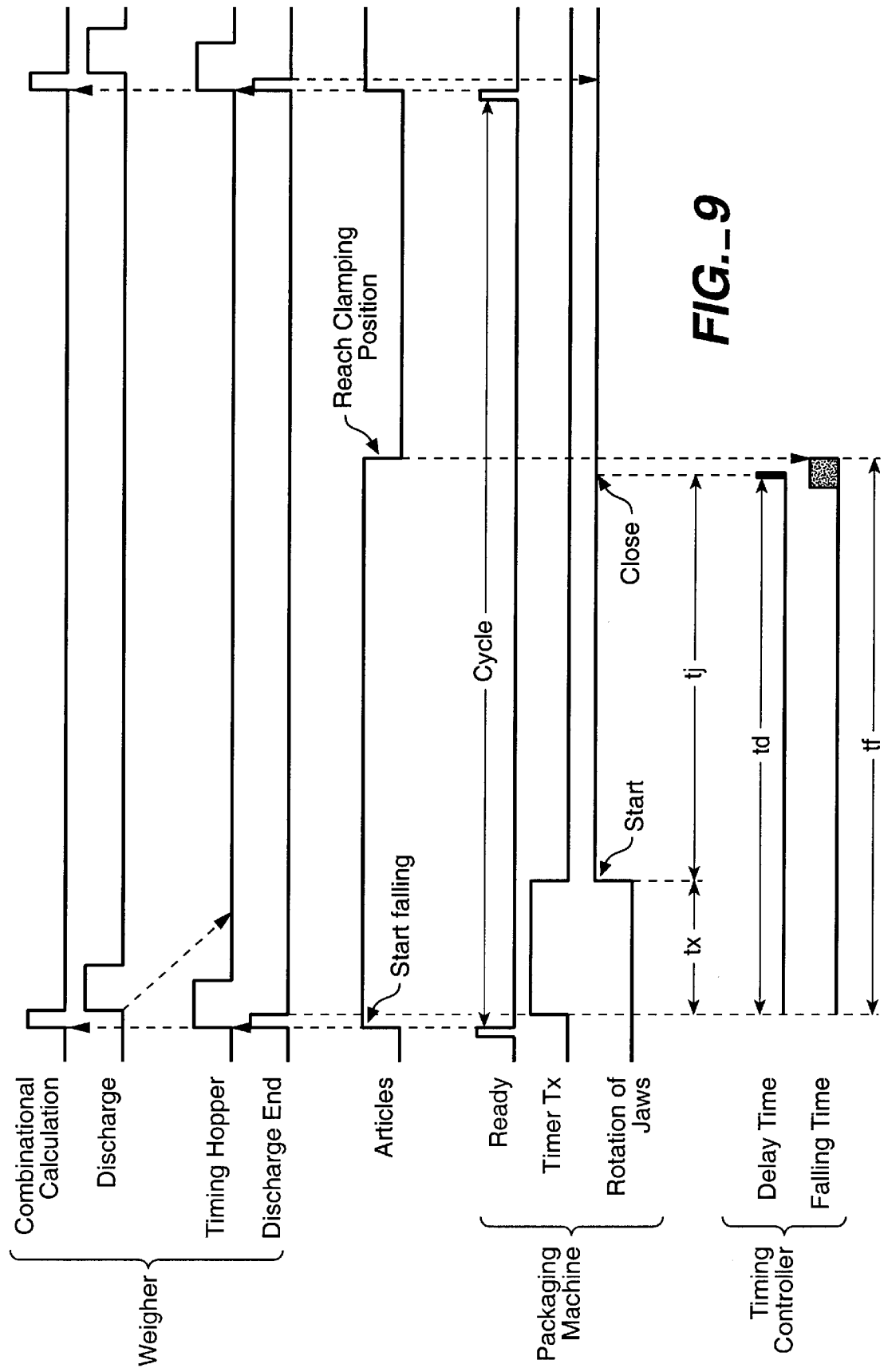
FIG._9

PACKAGING MACHINE INCORPORATING TIMING CONTROLLER

BACKGROUND OF THE INVENTION

This invention relates to a form-fill-seal type packaging machine which incorporates a timing controller for controlling its timing for operating a mechanically controllable machine part according to the motion of an object or a batch of articles which may be freely falling in space.

Among the devices requiring such a timing controller is not only a vertical pillow type form-fill-seal packaging machine but also a sorter of the type using an air jet to selectably remove or not remove objects which are being transported at a high speed or falling freely in air. A vertical pillow type form-fill-seal packaging machine is generally controlled such that a tubularly formed elongated bag-making material (herein referred to as "the film") is transversely sealed thermally between a pair of seal jaws, while the film is being transported vertically downward and articles to be packaged are intermittently dropped from above, so as to thereby simultaneously close the bag into which articles have already been dropped and to form the bottom of the next bag into which a new article batch is to be dropped. Thus, if the timing of closing the seal jaws to seal the tubularly formed film is incorrectly set, some of the articles being dropped from above may be caught in between, thereby producing imperfectly sealed products. In order to prevent the occurrence of such events, it is customary to adjust the timing of moving the seal jaws by using a transparent film in a test run. It now goes without saying that the sorter of the kind described above also requires a test run for adjusting the timing for releasing air jets.

Adjustments by such test runs are not a simple process. In the case of packaging relatively light articles without a definite shape such as potato chips, for example, it is extremely difficult to determine whether they are being caught near the front end or near the rear end. As a result, it take an extra effort to adjust the timing of the operation.

SUMMARY OF THE INVENTION

It is therefore an object of this invention to provide a form-fill-seal packaging machine incorporating an improved timing controller adapted to display the timing of encounter between a moving object and a mechanically controllable mobile machine part in a static manner on a time axis or parallel axes such that the adjustment of the timing for operating the machine part can be carried out easily and dependably on the basis of such a visual representation even if the actual encounter between the object and the machine part takes place instantaneously.

A timing controller embodying this invention, with which the above and other objects can be accomplished, may be characterized not only as serving to control the motion of a mobile machine part according to the motion of a specified moving object but also as comprising a display device for displaying markers on a time axis or axes and control means for moving a marker on the display device and to thereby control the motion of the mobile machine part. Both a marker indicative of the time at which the moving object of interest will arrive at a specified position and another marker indicative of the time at which the mobile machine part will arrive at the same specified position will be displayed. With such a timing controller, the user can visualize the times of arrival at the specified position by the mobile machine part and the moving object of interest, and a change in the timing of arrival of the mobile machine part to the specified position can be easily effected merely by operating this control means to move a marker on the corresponding time axis.

A packaging machine, embodying this invention, of the type having transverse sealers for sealing to close a bag-forming film after articles to be packaged are dropped in may be broadly characterized as having a similar display device, as well as means for controlling the motion of these transverse sealers. The display device displays the times of arrival of the transverse sealers and the articles dropping into the bag at the clamping position where the film is clamped by the transverse sealers.

For adjusting the motion of the transverse sealers, the user specifies what is herein referred to as the "delay time" which is defined as the time period between a pre-defined starting time and the time when the transverse sealers clamp the film therebetween. If a sensor is provided at a suitable position for detecting the articles being dropped, this "starting time" may be taken as the time when the articles being dropped are detected by this sensor. Alternatively, the "starting time" may be defined as the time when these articles are dropped, say, from a weigher disposed above the packaging machine. The time (referred to as the "falling time"), taken by the dropping articles to reach the clamping position from the "starting time", no matter how defined as above, is determinable experimentally for each of different kinds of articles and is stored in a memory. When making packages of a particular kind of articles, the user may specify the kind of articles through a retrieving means which serves to retrieve from the memory the "falling time" of the specified kind of articles and this retrieved information is caused to be displayed on the display device for the user to see. The user sets the delay time according to the displayed falling time.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a schematic representation of a display by a timing controller embodying this invention;

FIG. 2 is a schematic representation of a display by another timing controller embodying this invention;

FIG. 3 is a schematic representation of another mode of display by the timing controller of this invention;

FIG. 4 is a schematic drawing including a block diagram of a packaging machine embodying this invention;

FIG. 5 is a time chart for the operation of the packaging machine of FIG. 4;

FIG. 6 is a time chart for the operation of the packaging machine of FIG. 4 in coordination with a combinational weigher;

FIG. 7 is a schematic representation of still another mode of display on the display device of the packaging machine shown in FIG. 4;

FIG. 8 is a schematic drawing including a block diagram of another packaging machine embodying this invention; and FIG. 9 is a time chart for the operation of the packaging machine of FIG. 8 in coordination with a combinational weigher.

Throughout herein, like or equivalent components are indicated by the same numerals and may not necessarily be described repetitiously.

DETAILED DESCRIPTION OF THE INVENTION

As defined above, a timing controller is a device for controlling the timing for operating a mechanically controllable mobile machine part according to the motion of an object or objects, and a timing controller according to this invention is characterized as having a display device, such as one shown at 81 in FIG. 1 adapted to display a single time axis 90 on its display screen 85 or another shown at 82 in FIG. 2 adapted to display two time axes 91 and 92. Markers are also displayed for indicating the time ta at which the moving object of interest arrives at a specified position (herein referred to as "the object arrival time" and the time tb at which a specified mechanically controllable mobile machine part will arrive at the same position (herein referred to as "the machine arrival time". In the case of the display device 81 of FIG. 1 with only one time axis 90, both markers for indicating the object arrival time ta and the machine arrival time tb are displayed on the same time axis 90. In the case of the display device 82 of FIG. 2 with two mutually parallel time axes 91 and 92, the two markers may be adapted to be displayed on different axes. It is to be noted that the marker for indicating the object arrival time is shown both in FIGS. 1 and 2 with a finite width. This is because when articles are dropped as a batch, say, into a tubularly formed film being made into a bag by a packaging machine, the articles of the batch arrive at a specified position at different times, tm and tn therefore representing the earliest arrival time and the latest arrival time, respectively. If the markers for ta and tb overlap each other, or are at a same horizontal position, this means that the object and the machine part "encounter".

The machine arrival time tb can be adjusted by adjusting the mode of operation of the mobile machine part. In FIGS. 1 and 2, numerals 96 and 97 respectively indicate an up key and a down key for changing the mode of operation in such a way that the arrival of the mobile machine part at the specified position will be delayed or accelerated, and the machine arrival time tb displayed on the screen 85 will be shifted to the right or to the left.

If the controllably mobile machine part, as referred to above, is a pair of seal jaws of a form-fill-seal packaging machine, to be described below more in detail, the purpose of the timing control will be to prevent the jaws from closing too early and catching any of the articles being dropped into a tubularly formed film. For an application like this, the marker for the object arrival time may be displayed so as to indicate the earliest arrival time tm of the dropped articles and a target time interval of a specified finite duration within which the seal jaws are to clamp the film in between.

FIG. 4 shows a vertical pillow type form-fill-seal packaging machine 10 of a generally known kind, comprising a former 11 for bending an elongated film 20 into a tubular form, a pair of pull-down belts 30 (only one of the pair being visible in FIG. 4) disposed below the former 11 for supporting the tubularly formed film 20 by adsorption from its sides to pull it downward, a longitudinal sealer 32 for longitudinally sealing the mutually overlapping side edges of the tubularly formed film 20, and a pair of transverse sealers 40 for thermally sealing and cutting in a horizontal direction the longitudinally sealed tubular film 20 so as to produce a bag 22 of a specified size. Each transverse sealer 40 comprises an elongated rotary member ("arm") 41 adapted to rotate in the direction of motion of the film 20 and a seal jaw 42 attached to the free end of the arm 41 such that the pair of seal jaws 42 will clamp the film 20 in between for thermally sealing it, As the arms 41 are controllably rotated by a servo motor ("the arm-rotating motor") 43, horizontally slidable axes of rotation 44 of the arms 41 are moved reciprocatingly back and forth horizontally towards and away from each other by means of another servo motor ("axis-shifting motor") 45 such that the pair of the seal jaws 42 will travel in D-shaped trajectories in a plane-symmetric relationship with respect to each other, as shown in part by broken lines in FIG. 4.

Shutter plates 47 are attached to the upper surfaces of the seal jaws 42 so as to be horizontally pushed towards each other by means of springs (not shown) such that they close on the film 20 before the seal jaws 42 engage each other to thereby prevent articles being dropped from invading the seal surface at the top of the bag 22 across which it is sealed. Stripping bars 48 are similarly attached to the lower surfaces of the seal jaws 42 so as to be horizontally extendable by means of springs (not shown). These stripping bars 48 are adapted to be closed immediately before the film 20 is sealed while the seal jaws 42 travel on the straight-line portions of their D-shaped trajectories such that articles being dropped are prevented from invading the seal surface.

FIG. 4 also shows a chute 12, which may be a part of a combinational weigher and through which articles 25 of a batch weighed thereby to be packaged are dropped into a receiving hopper 13 disposed above the former 11. A sensor 15 is disposed on the path of the articles dropped through the chute 12. Since the purpose of this sensor 15 is to detect the articles being dropped but since the dropped articles 25 individually travel on varied trajectories, it comprises a light emitter and a light receiver capable of covering an entire plane through which the articles 25 must pass. Although FIG. 4 shows the sensor 15 between the hopper 13 and the chute 12, it may be positioned somewhat lower if the film 20 is made of a transparent material.

The packaging machine 10, as schematically shown in FIG. 4, includes a control system which incorporates a timing controller 50 for setting a delay time td from when the sensor 15 detects a falling article until the transverse sealers 40 clamp the film 20 in between, a sealer controlling means 51 for controlling the motion of the arm-rotating and axis-shifting motors 43 and 45 so that the film 20 will be clamped between the transverse sealers 40 with the timing determined by the delay time td set by the timing controller 50, and a memory 52 for storing the time of fall ("the falling time") tf from when the dropping articles 25 are detected by the sensor 15 until they pass the position at which the film 20 is clamped ("the clamping position" where the transverse sealers 40 are shown by solid lines in FIG. 4). The delay time td is set to be shorter than the falling time tf, as shown in the time chart of FIG. 5, such that the transverse sealers 40 will clamp the film 20 before the articles 25 falling inside the tubular film 20 reach the clamping position. The travel time tj of the seal jaws 42 from when they start their motion from their specified initial positions is known for each mode of motion. The starting time of the motion of the seal jaws 42 is therefore determined from the delay time td as shown in FIG. 5.

As also shown schematically in FIG. 4, the timing controller 50 of the control unit for the packaging machine 10 includes a display device 54 on which the delay time td and the falling time tf are displayed (either on one time axis or on two time axes, as described above with reference to FIGS. 1 and 2). The timing controller 50 may be operated either manually or automatically. In the case of a manually operated type, the input of the delay time td may be effected by means of an up key and a down key, as explained above with reference to FIGS. 1 and 2. In the case of an automatically operated type, the falling time tf may be experimentally measured and stored in the memory 52, and this stored value may be used to calculate the delay time td, for example, as a specified fraction of the falling time. The manual and automatic operation modes may be made switchable such that the delay time td can be automatically set although, if articles with a different shape are to be packaged, the corresponding falling time tf may be different. The delay time td can be manually corrected accordingly, say, by a key input through an input means 55.

The falling time tf of articles changes somewhat, depending on the shape of the articles but can be measured accurately by using a transparent film, and a measured value thus obtained is stored in the memory 52. For safety, the shortest of the measured falling times should preferably be stored. If the falling time tf changes significantly, depending on the kind of articles to be packaged, the falling time tf for each kind of articles may be stored in the memory 52. At the time of an actual operation, the type of the articles to be packaged may be specified through the input means 55 to cause a retrieving means 56 to retrieve the falling time tf of the specified kind of articles from the memory 52 and to have it displayed on the display device 54.

Although FIG. 4 shows transverse sealers 40 of a rotary type with the arms 41 undergoing a continuous rotary motion, the invention may be equally well incorporated in a packaging machine with transverse sealers of a type which undergo a so-called "box motion" whereby seal jaws are caused to move along box-shaped trajectories with horizontal and vertical parts. The time chart shown in FIG. 5 is applicable to transverse sealers of whichever type. Since the delay time td from the start until the transverse sealers 40 engage each other is determined as soon as the speed of operating the packaging machine 10 is set, the starting time for the transverse sealers 40 is automatically determined once the delay time td is set. The sealer controlling means 51 then serves to start the motion of the seal jaws 42 at the start time thus calculated from the delay time td and to thereafter operate the arm-rotating and axis-shifting motors 43 and 45 in known manners such that the transverse sealers 40 will engage together at the clamping position at the set delay time td.

Operation of the packaging machine 10 shown in FIG. 4, in coordination with the operation of a combinational weigher disposed thereabove, will be described next with reference to the time chart shown in FIG. 6.

Initially, the seal jaws 42 are set at their specified initial positions and a ready signal is outputted to the weigher. Upon receiving this ready signal from the packaging machine 10, the weigher carries out a combinational calculation, discharges articles 25 having a total weight within a specified range in a manner well known in the art of combinational weighing and outputs a discharge-end signal to the packaging machine 10, indicating that a batch of articles has been discharged. If the combinational calculation was unsuccessful, a failure signal may be caused to be outputted instead of a discharge-end signal.

Upon receiving the discharge-end signal from the weigher, the packaging machine 10 starts a timer Tx (not shown). After a specified time period tx, the sealer controlling means 51 controls the arm-rotating and axis-shifting motors 43 and 45 so as to cause the seal jaws 42 to undergo a specified rotary motion such that they reach the clamping position after a travel time tj and the shutter plates 47 engage together. Immediately thereafter, the fastest dropping ones of the articles 25 being dropped will reach the clamping position but since the shutter plates 47 are already closed, the articles 25 are not caught between the seal jaws 42. Next, the seal jaws 42 move straight downward, stripping the bag 22. When they reach the seal-start positions indicated by numeral 46 where the arms 41 are horizontal (not shown), they begin to thermally seal the bag 22 while moving vertically downward. After the bag 22 is thus sealed and is cut by means of a cutter (not shown) imbedded in one of the seal jaws 42, the seal jaws 42 move in circular arcs (not completely shown) to return to their initial positions (from the seal-end positions indicated by broken lines in FIG. 4).

In the meantime, the pull-down belts 30 serve to advance the film 20 by the length of one bag in synchronism with one cycle of the rotary motions of the seal jaws 42. When this is done, the packaging machine 10 outputs a ready signal again to the weigher thereabove to start the next cycle of operations. If no discharge-end signal is outputted thereupon from the weigher, the packaging machine 10 simply waits until the beginning of the next cycle and then outputs another ready signal. The process described above is for the first cycle. From the second cycle onward, the sealer controlling means 51 does not use the start timer Tx but controls the motion of the seal jaws 42 according to the specified mode of steady operation described above.

The display on the display device 54 may be as shown in FIGS. 1, 2 or 3. Alternatively, as shown in FIG. 7, three time axes 91, 92 and 93 may be displayed, one of them (93) displaying the "passing time" tc at which the dropped articles 25 pass the position of the sensor 15, another axis (92) displaying the delay time td from the moment (also referred to as the "starting time" below) when the sensor 15 detects the articles 25 until the shutter plates 47 are closed, and the third axis (91) displaying the falling time tf of the articles 25 between the position of the sensor 15 and that of the shutter plates 47. The falling time tf is stored in the memory 52. If the user specifies through the input means 55 (say, by a code which may be a number) the kind of articles to be dropped, the retrieving means 56 retrieves from the memory 52 the falling time tf for the specified kind of articles and the retrieved falling time tf is caused to be displayed on the display device 54 together with a target range with a finite width, as explained above with reference to FIG. 3. The width of this target range is selected according to the period of the cyclic operation of the packaging machine 10, or the number of bags to be made per unit time. The shorter this period of the cycle, or the faster the packages are to be made, the smaller will be the width. The delay time td is adjusted by the up key 96 and the down key 97, as described above. The time thus set is displayed on the display device 54. This mode of display is advantageous in that the length of the articles and the discharge timing can be visualized. If this axis 93 is used additionally to display the passing time tc, the user can see the length of the "tails" trailing the falling articles and hence can predict the shift in the timing more reliably.

In order to adjust the timing of the machine operation by using such a screen display, the user operates the up key 96 and the down key 97 to move the marker for the delay time td such that it will come to a center position of the allowable range with a finite width displayed on the display device 54, as explained above. As the marker is thus moved, the starting time of the seal jaws 42 also changes. Since the travel time tj of the seal jaws 42 from their initial positions until the shutter plates 47 are closed is uniquely set according to the packaging speed, or the number of bags to be made per unit time, the starting time for the motion of the seal jaws 42 changes accordingly as the marker is moved, that is, as the delay time td is changed. As a result, the specified time period tx to be counted by the timer Tx is also determined.

Although the travel time tj is obtained in this example according to the position at which the shutter plates 47 close, this position may change if the bag size or the stripping distance is changed. In such a situation, the travel time tj is corrected and, if necessary, the falling time tf is also changed and displayed on the display device 54. Thus, the displayed position of the marker will be shifted, and the user operates the up key 96 and the down key 97 again to bring the marker for the delay time td to the center of the target range.

Similarly as above, the specified time tx to be counted by the start timer Tx is accordingly determined, and the starting time of the seal jaws 42 is thereby also determined.

The motion of the seal jaws 42 need not be started according to the time of detection by a sensor. The timing control may be effected instead on the basis of the discharge of articles from the weigher. FIG. 8 shows another packaging machine 10' controlling the timing of its operation in this manner. Since this packaging machine 10' is structured nearly identically to the packaging machine 10 shown in and described with reference to FIG. 4 above except that the sensor 15 of FIG. 4 is absent, the same or substantially equivalent components are indicated by the same numerals and are not described repetitiously.

In FIG. 8, numeral 19 indicates a timing hopper at the bottom of the weigher disposed above the packaging machine 10'. The timing hopper 19 is for temporarily holding an article batch to be discharged together. Unlike the timing controller of FIG. 4, that of FIG. 8 serves to set a delay time td between when the hopper 19 discharges a batch of weighed articles and when the transverse sealers 40 clamp the film 20. The memory 52 of FIG. 8 stores the falling times tf of articles of different kinds as measured from the moment when they are discharged from the timing hopper 19 above the packaging machine 10' until they reach the clamping position of the transverse sealers 40. As explained above with reference to FIG. 4, the delay time td is set shorter than the falling time tf such that the transverse sealers 40 will be closed before the falling articles reach the clamping position, as shown in the timing chart of FIG. 9.

As shown in FIG. 9, the timing hopper 19 of the weigher opens or closes in response to a ready signal transmitted from the packaging machine 10'. Since the time to start moving the seal jaws 42 is automatically determined by calculating backward from the travel time tj, the sealer controlling means 51 can start the motion of the transverse sealers 40 once the travel time tj is determined. The functions of the display device 54, the input means 55 and the retrieving means 56 are substantially the same as described above with reference to FIG. 4.

The operation of the packaging machine 10' of FIG. 8 will be explained more systematically next with reference to the timing chart of FIG. 9. As in the operation of the packaging machine 10 of FIG. 4, the seal jaws 42 are initially at their specified initial positions. When a ready signal is outputted from the packaging machine 10', the weigher immediately causes the articles then in the timing hopper 19 to be discharged and outputs a discharge-end signal back to the packaging machine 10'. The weigher then carries out a combinational calculation, selects a combination of articles in a manner known in the art of combinational weighing, discharges them into the timing hopper 19, which is now empty, and waits for the next ready signal from the packaging machine 10'. If the combinational calculation was unsuccessful, a failure signal may be outputted instead of a discharge-end signal. If a discharge-end signal is received, the packaging machine 10' starts the timer Tx. The subsequent operations by the timing controller 50 are the same as explained above with reference to FIGS. 4 and 6.

With the packaging machine 10' of FIG. 8, the delay time td and the falling time tf are measured from the moment when the timing hopper 19 discharges the articles but the display on the time axis or axes on the screen of the display device 54 is substantially the same as described above. Similarly, since the delay time td, the falling time tf, the travel time tj of the seal jaws 42 from their initial positions until the transverse sealers 40 clamp together and the time tx to be counted by the timer Tx are related as shown in FIG. 9, the time tx to be counted is automatically determined as the marker is set within the range for the target region, as explained above, and the sealer controlling means 51 serves to start the motion of the transverse sealers 40 when the timer Tx counts up the time tx thus set.

The invention has been described above with reference to only a limited number of examples, but these examples are not intended to limit the scope of the invention. Many modifications and variations are possible within the scope of the invention. For example, the packaging machines 10 and 10' may be provided also with a pair of gates 60, although their presence was ignored for convenience when the operations of the packaging machines 10 and 10' were described above. When the articles to be dropped for packaging are sugar-coated or salt-coated and/or easily breakable like potato chips, powders or small pieces separated from main bodies of the articles tend to keep dropping into the bag constantly in a continuous motion. In such a case, even if the tubularly formed film 20 is stripped in a conventional manner by means of the stripping bars 48, these powders and small pieces are easily caught in the sealing surface. The gates 60 are provided between the pull-down belts 30 and the transverse sealers 40 and are temporarily closed before the seal jaws 42 are closed so as to create an empty space containing no articles between the closed position of the gates 60 and the clamping position of the seal jaws 42. According to the example shown in FIG. 4, the gates 60 comprise L-shaped members 62 attached to the axes of rotation of rotary cylinders 61 and are adapted to swing instantaneously by 90 degrees from vertical positions (shown by solid lines) to horizontal positions (shown by broken lines) so as to sandwich the tubular film 20 therebetween. Such a gate mechanism is well known and hence its detailed structure will not be illustrated. It now goes without saying that these gates 60 may comprise a pair of plates adapted to move horizontally towards or away from each to open or close. In all situations, the opening and closing of the gates 60 must be effected quickly so as not to cause any jamming in the film 20 which is moving downward therebetween continuously.

What is claimed is:

1. A packaging machine comprising:

article dropping means for dropping articles to be packaged into a tubularly formed film;

sealing means for clamping and sealing said tubularly formed film to produce a closed bag containing said articles;

controlling means for controlling motion of said sealing means according to the motion of articles dropped by said article dropping means; and a display device displaying markers indicative of a sealer arrival time at which said sealing means controlled by said controlling means will arrive at a specified position and an object arrival time immediately before said articles dropped by said article dropping means will arrive at said specified position.

2. The packaging machine of claim 1 wherein said specified position is where said tubularly formed film is clamped by said sealing means.

3. The packaging machine of claim 1 wherein motion of said sealing means is controlled by said controlling means such that the articles dropped by said article dropping means arrive at said specified position immediately before said sealing means clamp and seal said tubularly formed film.

4. The packaging machine of claim 1 wherein said display device also displays a first time axis and a second time axis which are mutually parallel, said sealer arrival time being indicated by one of said markers along said first time axis and said object arrival time being indicated by another one of said markers along said second time axis.

* * * * *